United States Patent
Otaka (10) Patent No.: US 11,503,517 B2
(45) Date of Patent: Nov. 15, 2022

(54) RELAY APPARATUS, PROGRAM, COMMUNICATION SYSTEM, AND METHOD

(71) Applicant: Honda Motor Co., Ltd., Tokyo (JP)

(72) Inventor: Masaru Otaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 17/174,016

(22) Filed: Feb. 11, 2021

(65) Prior Publication Data

US 2021/0168675 A1   Jun. 3, 2021

Related U.S. Application Data

(63) Continuation of application No. PCT/JP2019/014244, filed on Mar. 29, 2019.

(51) Int. Cl.
*H04W 36/00* (2009.01)
*H04W 76/27* (2018.01)
(Continued)

(52) U.S. Cl.
CPC ......... *H04W 36/0083* (2013.01); *H04W 4/40* (2018.02); *H04W 16/26* (2013.01); *H04W 36/0085* (2018.08); *H04W 76/27* (2018.02); *H04W 84/005* (2013.01); *H04W 84/047* (2013.01); *H04W 88/04* (2013.01)

(58) Field of Classification Search
CPC . H04W 88/04; H04W 84/005; H04W 84/047; H04W 4/40
See application file for complete search history.

(56) References Cited

U.S. PATENT DOCUMENTS

| | | | |
|---|---|---|---|
| 2011/0021221 | A1 | 1/2011 | Kondo |
| 2011/0177819 | A1* | 7/2011 | Kitahara ............. H04W 36/245 455/436 |

(Continued)

FOREIGN PATENT DOCUMENTS

| | | |
|---|---|---|
| CN | 102273246 A | 12/2011 |
| EP | 2393316 A | 12/2011 |
| EP | 2830344 A1 | 1/2015 |
| JP | 2004320370 A | 11/2004 |

(Continued)

OTHER PUBLICATIONS

International Search Report of related international application PCT/JP2019/014244, dated Apr. 23, 2019.

(Continued)

*Primary Examiner* — Nam T Huynh
(74) *Attorney, Agent, or Firm* — Mark Duell; American Honda Motor Co., Inc.

(57) ABSTRACT

To provide a relay apparatus for relay communication between a wireless base station and a communication terminal, the relay apparatus including: a relay function management switch for switching from on to off a relay function for relaying communications between the wireless base station and the communication terminal based on the satisfaction of a predetermined condition; and a signal transmitter for transmitting, to the communication terminal, establishing a wireless communication connection with the relay apparatus, a signal to execute handover to a handover destination which is identified before the predetermined condition has been satisfied if the predetermined condition has been satisfied.

11 Claims, 6 Drawing Sheets

(51) Int. Cl.
*H04W 16/26* (2009.01)
*H04W 88/04* (2009.01)
*H04W 84/04* (2009.01)
*H04W 4/40* (2018.01)
*H04W 84/00* (2009.01)

(56) References Cited

U.S. PATENT DOCUMENTS

| | | | |
|---|---|---|---|
| 2011/0256826 A1* | 10/2011 | Ode | H04B 7/15535 455/7 |
| 2015/0043422 A1 | 2/2015 | Fujishiro et al. | |
| 2015/0181498 A1* | 6/2015 | Li | H04W 36/0058 455/437 |

FOREIGN PATENT DOCUMENTS

| | | |
|---|---|---|
| JP | 2011029988 A | 2/2011 |
| JP | 2011135439 A | 7/2011 |
| JP | 2014003696 A | 1/2014 |
| JP | 2016076960 A | 5/2016 |
| KR | 1020110102421 A | 9/2011 |
| WO | WO2010086979 A1 | 8/2010 |
| WO | WO2013141321 A1 | 9/2013 |

OTHER PUBLICATIONS

English Translation of International Search Report of related international application PCT/JP2019/014244, dated Apr. 23, 2019.
Written Opinion of the International Searching Authority of related international application PCT/JP2019/014244, dated Apr. 23, 2019.

* cited by examiner

RELAY APPARATUS, PROGRAM, COMMUNICATION SYSTEM, AND METHOD

CROSS-REFERENCE TO RELATED APPLICATIONS

This application is a continuation application of International Patent Application No. PCT/JP2019/014244, which is incorporated by reference herein in its entirety.

TECHNICAL FIELD

The embodiments presented relate to a relay apparatus, a program, a communication system, and a method.

BACKGROUND

A movable relay apparatus which functions as a base station is known. A technology capable of appropriately supporting the operation of a relay apparatus is desired.

SUMMARY

According to one aspect, a relay apparatus for relay communication between a wireless base station and a communication terminal includes a relay function management switch for switching from on to off a relay function for relaying communications between the wireless base station and the communication terminal based on satisfaction of a predetermined condition, and a signal transmitter for transmitting, to the communication terminal establishing a wireless communication connection with the relay apparatus, a signal to execute handover to a handover destination if the predetermined condition has been satisfied, wherein the handover destination is identified prior to the predetermined condition being satisfied.

According to another aspect, a computer-implemented method includes the steps of switching from on to off a relay function of a relay apparatus for relaying communications between a wireless base station and a communication terminal based on a satisfaction of a predetermined condition, identifying a handover destination from the relay apparatus of the communication terminal before the predetermined condition has been satisfied, and transmitting, to the communication terminal, establishing a wireless communication connection with the relay apparatus, a signal to execute handover to the handover destination if the predetermined condition has been satisfied.

According to yet another aspect, a computer-implemented method includes the steps of switching from on to off a relay function of a relay apparatus for relaying communications between a wireless base station and a communication terminal based on a satisfaction of a predetermined condition, identifying a handover destination from the relay apparatus of the communication terminal before the predetermined condition has been satisfied, and transmitting to the communication terminal, a signal to execute handover to the handover destination which is identified in the identifying stage if the predetermined condition has been satisfied.

According to still yet another aspect, a non-transitory machine-readable storage medium comprising instructions, which when implemented by one or more machines, cause the one or more machines to perform operations includes switching with a relay function management switch from on to off a relay function for relaying communications between a wireless base station and a communication terminal based on a satisfaction of a predetermined condition, and transmitting with a signal transmitter, to the communication terminal establishing a wireless communication connection with a relay apparatus, a signal to execute handover to a handover destination if the predetermined condition has been satisfied, wherein the handover destination is identified prior to the predetermined condition being satisfied.

In accordance with an aspect of the presented embodiments, a relay apparatus is provided for relay communication between a wireless base station and a communication terminal. The relay apparatus may include a relay function management switch for switching from on to off a relay function for relaying communications between the wireless base station and the communication terminal based on the satisfaction of predetermined conditions. The relay apparatus may include a signal transmitter for transmitting, to the communication terminal establishing a wireless communication connection with the relay apparatus, a signal to execute handover to a handover destination which is identified before the predetermined conditions have been satisfied if the predetermined conditions have been satisfied.

If the predetermined conditions have been satisfied, the signal transmitter may transmit, to the communication terminal establishing a wireless communication connection with the relay apparatus, a signal, wherein the communication terminal executes handover to the handover destination without making a measurement report on the received radio waves. The signal transmitter may transmit the radio resource control ("RRC") connection reconfiguration including the specification of the handover destination. The signal transmitter may transmit, to the communication terminal, a signal to execute handover with the wireless base station, with which the relay apparatus establishes a wireless communication connection, serving as the handover destination.

The relay apparatus may be installed in a moving body. The relay apparatus may include a reception strength measurement part for measuring the radio wave reception strength from multiple movable relay apparatuses different from the relay apparatus, wherein the signal transmitter may transmit, to the communication terminal, a signal to execute handover with the relay apparatus having a stronger radio wave reception strength among the multiple movable relay apparatuses serving as the handover destination. The relay apparatus may include a change determination part for determining temporal changes in the radio wave reception strength from multiple movable relay apparatuses different from the relay apparatus, wherein the signal transmitter may transmit, to the communication terminal, a signal to execute handover with the relay apparatus having a stronger radio wave reception strength and smaller temporal changes among the multiple movable relay apparatuses serving as the handover destination. The relay apparatus may include a change determination part for determining temporal changes in the radio wave reception strength from multiple movable relay apparatuses different from the relay apparatus, wherein the signal transmitter may transmit, to the communication terminal, the signal to execute handover with the relay apparatus having smaller temporal changes among the multiple movable relay apparatuses serving as the handover destination.

The relay apparatus may include an estimation part for inferring that the relay function has been turned off by monitoring the state of the moving body while the relay function is turned on, wherein the signal transmitter may transmit a signal to execute handover to the handover destination to the communication terminal, establishing a wireless communication connection with the relay apparatus as the estimation part infers that the relay function has been turned off. The estimation part may estimate that the relay function has been turned off if the movement speed of the moving body satisfies predetermined conditions. The estimation part may estimate that the relay function has been turned off if the movement speed of the moving body is slower than a predetermined speed. The estimation part may infer that the relay function has been turned off upon detecting the power source off operation of the moving body. The moving body may be a vehicle, wherein the estimation part may infer that the relay function has been turned off upon detecting the ignition off operation of the vehicle.

In accordance with an aspect of the presented embodiments, a program is provided for allowing a computer to function as the relay apparatus.

In accordance with an aspect of the presented embodiments, a communication system is provided. The communication system may include a relay function management switch for switching from on to off a relay function of a relay apparatus for relaying communications between a wireless base station and a communication terminal based on the satisfaction of predetermined conditions. The communication system may identify a handover destination from the relay apparatus of the communication terminal before the predetermined conditions have been satisfied. The communication system may include a signal transmitter for transmitting, to the communication terminal establishing a wireless communication connection with the relay apparatus, a signal to execute handover to the identified handover destination if the predetermined conditions have been satisfied.

In accordance with an aspect of the presented embodiments, a management method is provided. The management method may include a relay function management stage for switching from on to off a relay function of a relay apparatus for relaying communications between a wireless base station and a communication terminal based on the satisfaction of predetermined conditions. The management method may include an identification stage involving identifying a handover destination from the relay apparatus of the communication terminal before the predetermined conditions have been satisfied. The management method may include a signal transmitter for transmitting, to the relay apparatus establishing a wireless communication connection with the communication terminal, a signal to execute handover to a handover destination which is identified in the identification stage if the predetermined conditions have been satisfied. In accordance with an aspect of the presented embodiments, a management method is provided. The management method may include a relay function management stage for switching from on to off a relay function of a relay apparatus for relaying communications between a wireless base station and a communication terminal based on the satisfaction of predetermined conditions. The management method may include an identification stage involving identifying a handover destination from the relay apparatus of the communication terminal before the predetermined conditions have been satisfied. The management method may include a signal transmitter for transmitting, to the communication terminal establishing a wireless communication connection with the relay apparatus, a signal to execute handover to a handover destination which is identified in the identification stage if the predetermined conditions have been satisfied.

DETAILED DESCRIPTION

Embodiments are described in detail below with reference to the accompanying drawings. Note that the following embodiments are not intended to limit the disclosure according to the claims, and all of the combinations of features described in the embodiments may not be required of the disclosure. Moreover, subcombinations of groups of these features may be included.

Figure 1:
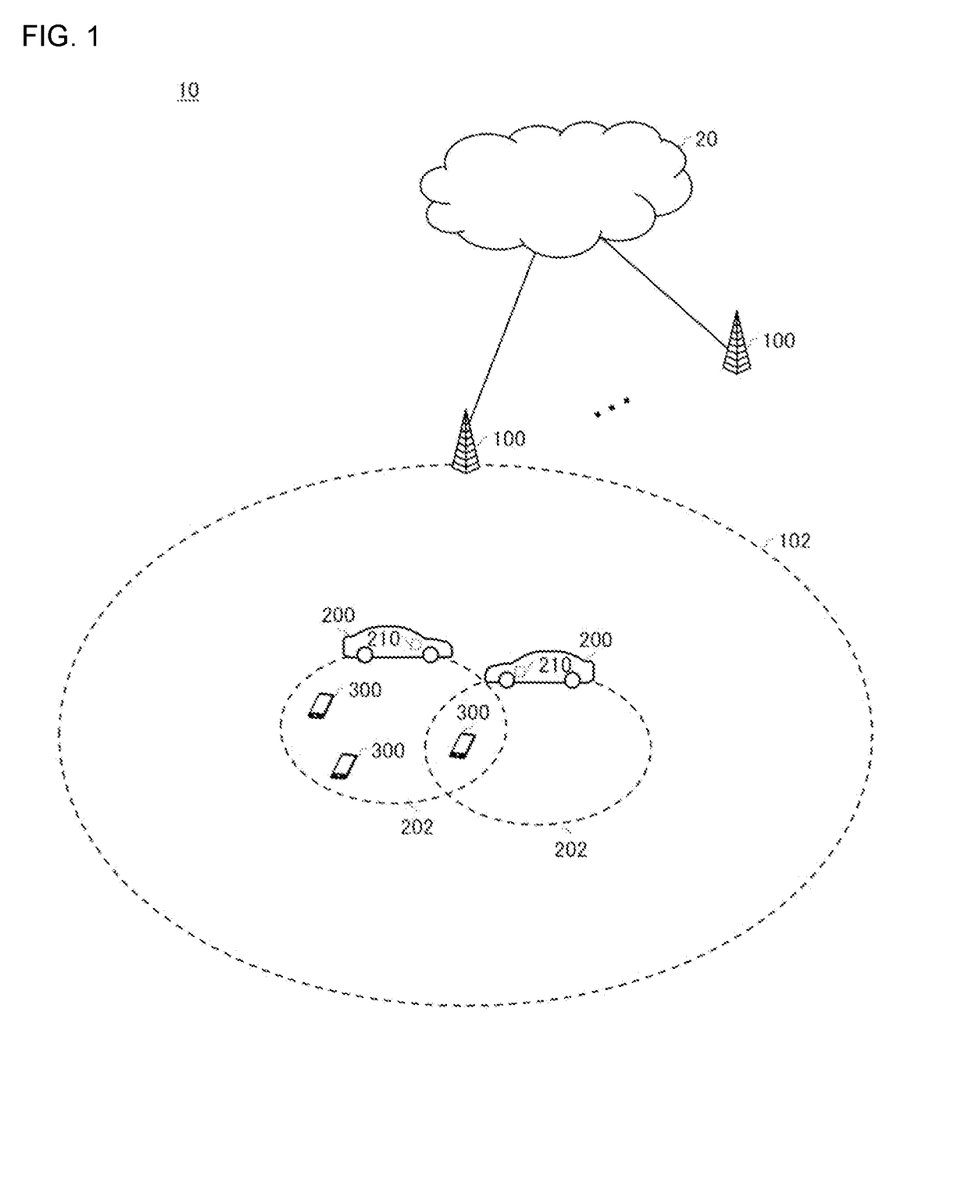
FIG. 1 schematically illustrates an example of a communication system 10 in accordance with one aspect of the present disclosure.

FIG. 1 schematically illustrates one example of a communication system 10. The communication system 10 includes a relay apparatus 210 for relaying communications between a wireless base station 100 and a communication terminal 300. The relay apparatus 210 may be installed in a moving body. In the present embodiment, a case in which the relay apparatus 210 is installed in a vehicle 200 will be described as an example. Vehicles 200 with the relay apparatus 210 installed may be referred to as moving base stations. The communication system 10 may include the vehicle 200. The communication system 10 may include the wireless base station 100. Other examples of the moving body include unmanned aircrafts such as drones. Note that the relay apparatus 210 need not be installed in a moving body but may be installed in a fixed manner.

The vehicle 200 may be an automobile. The vehicle 200 may be any type of automobile as long as it has a wireless communication function. For example, the vehicle 200 may be a gasoline powered vehicle or may also be a so-called eco-friendly vehicle. Types of eco-friendly cars include (hybrid vehicles ("HVs"), plug-in hybrid vehicles ("PHEVs/PHVs"), electric vehicles ("EVs"), and fuel cell vehicles ("FCVs"). The vehicle 200 may be an automobile for any application. The vehicle 200 may be, for example, a private car or vehicle for business such as a taxi or bus.

The wireless base station 100 may conform to any mobile communication system. The wireless base station 100 conforms, for example, to a 3rd Generation ("3G") communication system. The wireless base station 100 conforms, for example, to a long term evolution (LTE) communication system. The wireless base station 100 may be an eNodeB ("eNB"). The wireless base station 100 conforms, for example, to a 5th Generation ("5G") communication system. The wireless base station 100 may be a gNodeB ("gNB"). The wireless base station 100 may conform to a mobile communication system following a 6th Generation ("6G") communication system. Here, the case in which the wireless base station 100 conforms to the LTE communication system will be mainly described as an example.

For example, the relay apparatus 210 is within the zone of a wireless communication area 102 generated by the wireless base station 100 so as to execute wireless communication with the wireless base station 100. The fact that the relay apparatus 210 is within the zone of a wireless communication area 102 generated by the wireless base station 100 may mean that the relay apparatus 210 is disposed in the wireless communication area 102 so as to establish a wireless communication connection with the wireless base station 100.

For example, the relay apparatus 210 generates a wireless communication area 202, and executes wireless communication with the communication terminal 300 which is within the zone of the wireless communication area 202. The fact that the communication terminal 300 is within the zone of the wireless communication area 202 may mean that the communication terminal 300 is disposed in the wireless communication area 202 so as to establish a wireless communication connection with the relay apparatus 210. Note that when the communication terminal 300 is within the zone of the wireless communication area 202 generated by the relay apparatus 210, it may be described that the communication terminal 300 is within the zone of the relay apparatus 210.

A moving body communication system between the relay apparatus 210 and the communication terminal 300 may be the same as a moving body communication system between the relay apparatus 210 and the wireless base station 100. Moreover, the moving body communication system between the relay apparatus 210 and the communication terminal 300 may be different from the moving body communication system between the relay apparatus 210 and the wireless base station 100.

The communication terminal 300 may be any communication terminal as long as it has a wireless communication function. The communication terminal 300 is, for example, a mobile phone such as a smart phone, a tablet terminal, a wearable terminal, a personal computer ("PC"), etc. Moreover, the communication terminal 300 may be an Internet of Things ("IoT") terminal.

The relay apparatus 210 according to the present embodiment can switch on and off a relay function for relaying communications between the wireless base station 100 and the communication terminal 300. The relay apparatus 210, for example, switches the relay function on and off in accordance with the operation of a passenger of a vehicle 200.

Moreover, for example, the relay function of the relay apparatus 210 is switched on and off in accordance with the operation state of the vehicle 200. For example, the vehicle 200 is a vehicle having an engine and has an off state, an accessory ("ACC") power source on state, an ignition ("IG") power source on state, and an engine on state. When the IG power source has been turned on, the relay function of the relay apparatus 210 is turned on, while if the IG power source has been turned off, the relay function of the relay apparatus 210 is turned off. Moreover, for example, when the engine has been turned on, the relay function of the relay apparatus 210 is turned on, while if the engine has been turned off, the relay function of the relay apparatus 210 is turned off. Note that when an ACC power source has been turned on, the relay function of the relay apparatus 210 may be turned on, while if the ACC power source has been turned off, the relay function of the relay apparatus 210 may be turned off.

Moreover, for example, if the vehicle 200 is an electric vehicle and has an off state, an ACC state (in which some electric components are available), an on state (in which all electric components are available), and a travelable state, then, when the vehicle is in the on state, the relay function of the relay apparatus 210 is turned on. If the state has been switched from the on state to the ACC state or the off state, the relay function of the relay apparatus 210 is turned off. Moreover, for example, in the travelable state, the relay function of the relay apparatus 210 is turned on, while if the state has been switched from the travelable state to the on state, the ACC state, or the off state, the relay function of the relay apparatus 210 is turned off.

Moreover, for example, if the vehicle 200 is an electric vehicle and has an off state, a power source on state, and a travelable state, then, when the vehicle is in the power source on state, the relay function of the relay apparatus 210 is turned on. If the state has been switched from the power source on state to the off state, the relay function of the relay apparatus 210 is turned off. Moreover, for example, in the travelable state, the relay function of the relay apparatus 210 is turned on, while if the state has been switched from the travelable state to the power source on state or the off state, the relay function of the relay apparatus 210 is turned off.

When the communication terminal 300 is within the zone of the relay apparatus 210 and the relay function of the relay apparatus 210 is switched off, the wireless communication connection of the communication terminal 300 is disconnected. If multiple communication terminals 300 are within the zone of the relay apparatus 210, reconnection frequently occurs.

If the relay function is in the on state, the relay apparatus 210 according to the present embodiment is configured to switch the relay function from on to off based on the satisfaction of the predetermined conditions. If the predetermined conditions have been satisfied, the relay apparatus 210 transmits, to the communication terminal 300 establishing a wireless communication connection with the relay apparatus 210, a signal to execute handover to a handover destination which is identified before the predetermined conditions have been satisfied.

The predetermined condition, for example, may be to detect a relay function off operation by the passenger of the vehicle 200. Moreover, for example, if the vehicle 200 is a vehicle having an engine and has the off state, the ACC power source on state, the IG power source on state, and the engine on state, the predetermined conditions are that the IG power source has been turned off, the engine has been turned off, the ACC power source has been turned off, etc. Moreover, for example, if the vehicle 200 is an electric vehicle and has the off state, the ACC state, the on state, and the travelable state, the predetermined conditions are that the state has been switched from the on state to the ACC state or the off state and from the travelable state to the on state, the ACC state, or the off state, etc. Moreover, for example, if the vehicle 200 is an electric vehicle and has the off state, the power source on state, and the travelable state, the predetermined conditions are that the state has been switched from the power source on state to the off state and from the travelable state to the power source on state or the off state, etc.

Before the predetermined conditions have been satisfied, the relay apparatus 210 may have an identification part for identifying the handover destination from the communication terminal 300 establishing a wireless communication connection with the relay apparatus 210. Then, if the predetermined conditions have been satisfied, the relay apparatus 210 may transmit, to the communication terminal 300, a signal to execute handover to a handover destination which is identified by the identification part.

If the predetermined conditions have been satisfied, the relay apparatus 210, for example, transmits, to the communication terminal 300, information indicating the handover destination identified by the identification part before the predetermined conditions have been satisfied as well as a signal to execute handover to the handover destination. Moreover, the relay apparatus 210, for example, transmits, to the communication terminal 300, information indicating the handover destination identified by the identification part before the predetermined conditions have been satisfied. Then, when the predetermined conditions have been satisfied, the relay apparatus 210 transmits, to the communication terminal 300, a signal to execute the handover to the handover destination indicated by the information.

Note that the identification part need not have the relay apparatus 210. For example, the wireless base station 100 may have the identification part. Moreover, for example, the apparatus in a core network 20 may have the identification part. In this case, a communication system 10 may include the apparatus having the identification part.

If the predetermined conditions have been satisfied, the relay apparatus 210 may transmit, to the communication terminal 300, a signal to execute handover to the handover destination identified before the predetermined conditions have been satisfied without making a measurement report on the radio signals or radio waves received by the communication terminal 300. The measurement report may be a so-called measurement report ("MR"). Such a handover executed without making a measurement report may be described as an unmeasured handover.

For areas within which multiple vehicles 200 are traveling, the state of the radio waves received by the communication terminal 300 continuously changes. In such a state, in order to execute a normal handover including making a measurement report on the radio waves received by the communication terminal 300, the state of the radio waves changes between the measurement and the handover, such that the communication terminal 300 may not be able to carry out the handover. Because the relay apparatus 210 according to the present embodiment allows the communication terminal 300 to execute an unmeasured handover, the case in which the communication terminal 300 cannot carry out handover due to differences in the states between the measurement time and the handover time can be prevented from occurring.

For unmeasured handovers, the communication terminal 300 specifies the handover destination without making a measurement report on the received radio waves. Therefore, for example, if the communication terminal 300 specifies a wireless base station which is not disposed in the wireless communication area, the communication terminal 300 may not be able to carry out the handover.

For example, the relay apparatus 210 according to the present embodiment allows the communication terminal 300 to execute an unmeasured handover specifying the wireless base station 100 in which the relay apparatus 210 is within the zone as the handover destination. When the relay apparatus 210 is disposed in the wireless communication area 102, it is highly likely that the communication terminal 300 which is within the zone of the relay apparatus 210 is also disposed in the wireless communication area 102. Therefore, the likelihood that the handover of the communication terminal 300 can be successful is increased.

The relay apparatus 210 may measure the radio wave reception strength of other multiple relay apparatuses 210, and allow the communication terminal 300 to execute the unmeasured handover by specifying a relay apparatus 210 having a stronger radio wave reception strength as the handover destination. It is highly likely that a certain vehicle 200 located closest to a vehicle 200, for example, a vehicle traveling in front of or behind on the same road, etc., is located relatively close by. For example, when a first relay apparatus 210 installed in a first vehicle 200 measures the radio wave reception strength, it is likely that a second vehicle 200, equipped with a second relay apparatus 210 having the highest radio wave reception strength, is located relatively close to the first vehicle 200, and the wireless communication area 202 of the first relay apparatus 210 and the wireless communication area 202 of the second relay apparatus 210 overlap each other. Consequently, because it is likely that the communication terminal 300 which is within the zone of the first relay apparatus 210 is located in the wireless communication area 202 of the second relay apparatus 210, the likelihood that the handover of the communication terminal 300 can be successful is high.

Figure 2:
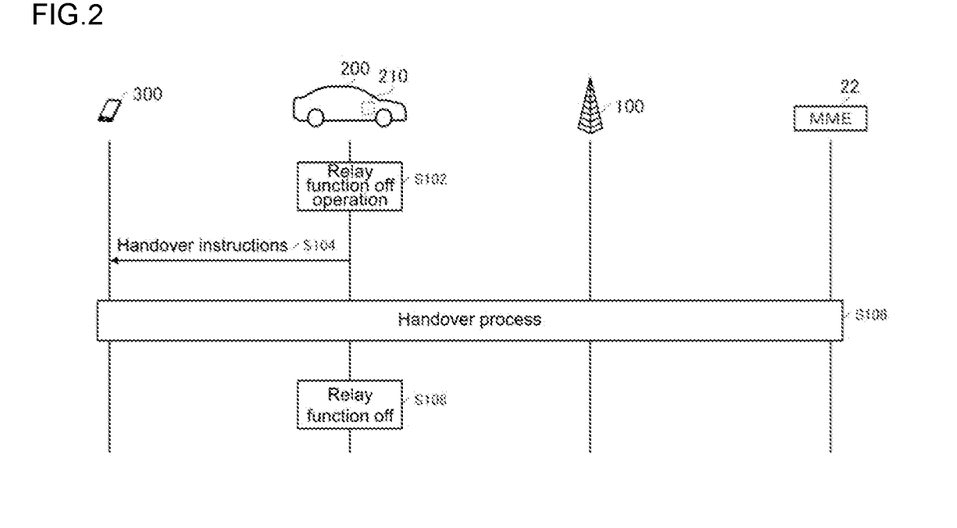
FIG. 2 schematically illustrates an example of the process flow in the communication system 10 in accordance with one aspect of the present disclosure.

FIG. 2 schematically illustrates one example of the process flow in the communication system 10. Here, if the communication terminal 300 is within the zone of the relay apparatus 210, the process flow of turning off the relay function of the relay apparatus 210 will be described.

In step 102 (the step may be abbreviated and described with the prefix S), the relay apparatus 210 accepts the off operation of the relay function by the passenger of the vehicle 200. In S104, the relay apparatus 210 determines that the predetermined conditions have been satisfied, and instructs an unmeasured handover to the communication terminal 300. That is, the relay apparatus 210 transmits, to the communication terminal 300, a signal to execute handover to the handover destination identified before the predetermined conditions have been satisfied without making a measurement report on the radio waves received by the communication terminal 300.

The relay apparatus 210, for example, transmits a signal to the communication terminal 300 in order to allow the communication terminal 300 to execute an unmeasured handover, which specifies the wireless base station 100 in which the relay apparatus 210 is within the zone, or a relay apparatus 210 different from the relay apparatus 210. The relay apparatus 210 transmits a message, for example, RRC connection reconfiguration specifying the handover destination, to the communication terminal 300.

In S106, the handover process is executed, leading to the handover of the communication terminal 300. The communication terminal 300, for example, carries out the handover to the wireless base station 100 in which the relay apparatus 210 is located within the zone, or a relay apparatus 210 that is different from the relay apparatus 210.

The handover process system or method may be any system or method. For example, the handover process may be an X2 handover. In this case, in S104, the relay apparatus 210 transmits handover instructions to the communication terminal 300, and then transmits a request for handover to the handover destination. The relay apparatus 210 transmits terminal information of the communication terminal 300 via an X2 interface to the handover destination, and carries out a synchronization process between the communication terminal 300 and the handover destination. Moreover, a request for switching a path is transmitted from the handover destination to a mobility management entity ("MME") 22 in a core network 20, wherein the MME 22 notifies the core side of the handover destination. Then, the path is switched on the core side, completing the handover. Note that the handover process may be the S1 handover.

In S108, after completing the handover of the communication terminal 300, the relay apparatus 210 turns off the relay function.

Figure 3:
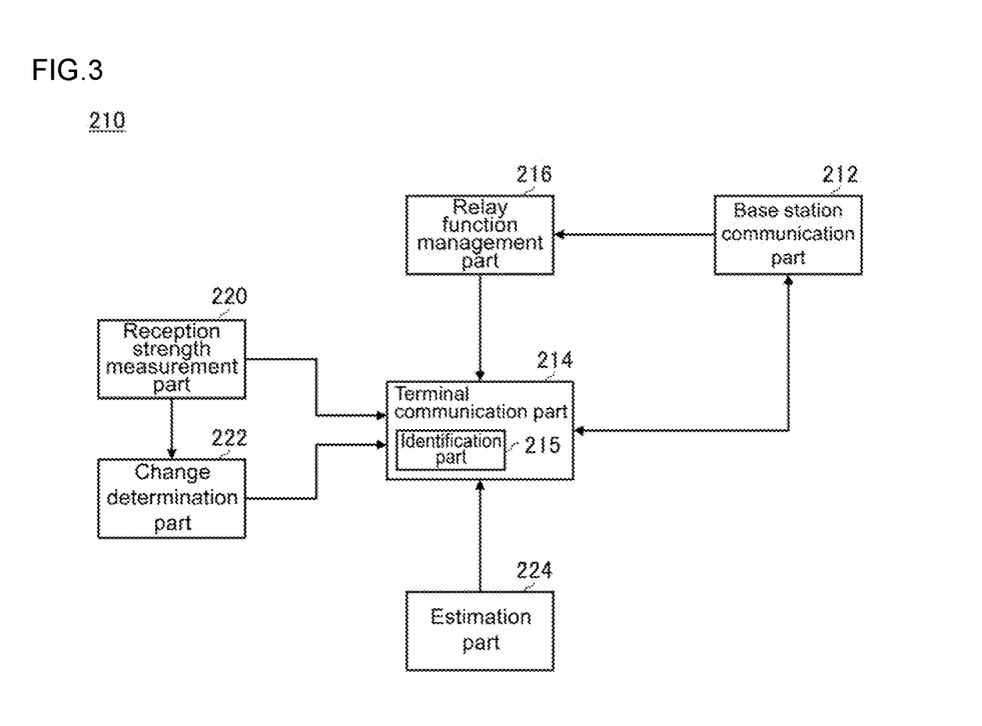
FIG. 3 schematically illustrates an example of the functional configuration of a relay apparatus 210 in accordance with one aspect of the present disclosure.

FIG. 3 schematically illustrates an example of the functional configuration of a relay apparatus 210. The relay apparatus 210 includes the base station communication part 212, a terminal communication part 214, a relay function management switch 216, a reception strength measurement part 220, a change determination part 222, and an estimation part 224. Note that it is not necessary for the relay apparatus 210 to include all of these configurations.

The base station communication part 212 wirelessly communicates with the wireless base station 100. The terminal communication part 214 wirelessly communicates with the communication terminal 300. The terminal communication part 214 has an identification part 215. The identification part 215 identifies the handover destination from the relay apparatus 210 of the communication terminal 300 which is within the zone of the relay apparatus 210. For example, the identification part 215 identifies the wireless base station 100 in which the relay apparatus 210 is within the zone as the handover destination from the relay apparatus 210 of the communication terminal 300. When the relay apparatus 210 is within the zone of a wireless base station 100 that is different than the wireless base station 100 which has been within the zone, the identification part 215 may re-identify the new wireless base station 100 as the handover destination.

The relay function management switch 216 manages the relay function for relaying communications between the wireless base station 100 and the communication terminal 300. The relay function management switch 216 may switch the relay function on and off. If the relay function is in the off state, the relay function management switch 216 switches the relay function from off to on based on the satisfaction of the predetermined conditions. Moreover, if the relay function is in the on state, the relay function management switch 216 switches the relay function from on to off based on the satisfaction of the predetermined conditions.

The relay function management switch 216, for example, switches the relay function on and off in accordance with the operation of the relay apparatus 210. For example, the relay function management switch 216 switches the relay function on and off in accordance with the operation of a passenger of a vehicle 200 equipped with the relay apparatus 210. As a specific example, if the relay function is in the off state, the relay function management switch 216 switches the relay function from off to on in response to the operation of turning on the relay function by the passenger of the vehicle 200. Moreover, if the relay function is in the on state, the relay function management switch 216 switches the relay function from on to off in response to the operation of turning off the relay function by the passenger of the vehicle 200.

Moreover, for example, the relay function management switch 216 switches the relay function on and off in accordance with the state of a moving body with the relay apparatus 210 installed therein. If the relay function is in the off state, the relay function management switch 216 switches the relay function from off to on based on the satisfaction of the predetermined conditions regarding the state of the moving body. Moreover, if the relay function is in the on state, the relay function management switch 216 switches the relay function from on to off based on the satisfaction of the predetermined conditions regarding the state of the moving body.

If the relay apparatus 210 is installed in the vehicle 200 having an engine, the relay function management switch 216, for example, turns on the relay function when the IG power source has been turned on. When the engine has been turned on, the relay function management switch 216 may turn on the relay function. When the ACC power source has been turned on, the relay function management switch 216 may turn on the relay function. When the IG power source has been turned off, the relay function management switch 216 may turn off the relay function. When the engine has been turned off, the relay function management switch 216 may turn off the relay function. When the ACC power source has been turned off, the relay function management switch 216 may turn off the relay function.

If the relay apparatus 210 is installed in an electric vehicle having the off state, the ACC state, the on state, and the travelable state, the relay function management switch 216 turns on the relay function if it is in the on state. The relay function management switch 216 may turn on the relay function when it is in the travelable state. The relay function management switch 216 may turn on the relay function when it is in the ACC the state. When the on state is switched to the ACC state or the off state, the relay function management switch 216 may turn off the relay function. When the travelable state is switched to the on state, the ACC state, or the off state, the relay function management switch 216 may turn off the relay function. When the ACC state is switched to the off state, the relay function management switch 216 may turn off the relay function.

If the relay apparatus 210 is installed in an electric vehicle having the off state, the power source on state, and the travelable state, the relay function management switch 216 may turn on the relay function if it is in the power source on state. The relay function management switch 216 may turn on the relay function when it is in the travelable state. When the power source on state is switched to the off state, the relay function management switch 216 may turn off the relay function. When the travelable state is switched to the power source on state or the off state, the relay function management switch 216 may turn off the relay function.

If the predetermined conditions for switching the relay function from on to off have been satisfied, the terminal communication part 214 transmits, to the communication terminal 300, which is within the zone of the relay apparatus 210, a signal to execute handover to a handover destination which is identified before the predetermined conditions have been satisfied. The terminal communication part 214 may be an example of a signal transmitter. The handover destination may be identified by the identification part 215 before the predetermined conditions have been satisfied. Moreover, the handover destination may be identified by the identification part possessed by the wireless base station 100 and notified to the relay apparatus 210 before the predetermined conditions have been satisfied.

If the predetermined conditions have been satisfied, the terminal communication part 214, for example, transmits, to the communication terminal 300, information indicating the handover destination identified before the predetermined conditions have been satisfied as well as a signal to execute handover to the handover destination. Moreover, the terminal communication part 214, for example, transmits, to the communication terminal 300, information indicating the handover destination identified before the predetermined conditions have been satisfied. Then, when the predetermined conditions have been satisfied, the relay apparatus 210 transmits, to the communication terminal 300, a signal to execute the handover to the handover destination indicated by the information.

If the predetermined conditions have been satisfied, the terminal communication part 214 may transmit, to the communication terminal 300, which is within the zone of the relay apparatus 210, a signal to execute handover to the handover destination identified before the predetermined conditions have been satisfied without making a measurement report on the radio waves received by the communication terminal 300. That is, the terminal communication part 214 may transmit, to the communication terminal 300, a signal to execute an unmeasured handover if the predetermined conditions have been satisfied. The terminal communication part 214 transmits a message, for example, the RRC connection reconfiguration, including the specification of the handover destination to the communication terminal 300.

The terminal communication part 214 may transmit, to the communication terminal 300, a signal to execute handover to the wireless base station 100 in which the relay apparatus 210 is within the zone. The terminal communication part 214, for example, transmits, to the communication terminal 300, a signal specifying the cell ID of the wireless base station 100, in which the relay apparatus 210 is within the zone, as the handover destination. Moreover, the terminal communication part 214, for example, transmits, to the communication terminal 300, a message, for example, the RRC connection reconfiguration, including the cell ID of the wireless base station 100 (the relay apparatus 210 is within the zone) as the handover destination.

The reception strength measuring part 220 measures the radio wave reception strength from other multiple relay apparatuses 210. The identification part 215 may identify the relay apparatus 210 having stronger radio wave reception strength among multiple relay apparatuses 210 as the handover destination from the relay apparatus 210 of the communication terminal 300. For example, the identification part 215 identifies the relay apparatus 210 having the strongest radio wave reception strength among multiple relay apparatuses 210 as the handover destination. The terminal communication part 214 may transmit, to the communication terminal 300, a signal which executes handover to the relay apparatus 210 having a stronger radio wave reception strength among the multiple relay apparatuses 210. For example, the terminal communication part 214 transmits, to the communication terminal 300, a signal to execute handover to the relay apparatus 210 having the strongest radio wave reception strength among the multiple relay apparatuses 210. The terminal communication part 214, for example, transmits, to the communication terminal 300, a signal specifying the relay apparatus 210 having a stronger radio wave reception strength as the handover destination. Moreover, the terminal communication part 214 transmits a message, for example, the RRC connection reconfiguration, including identification information for identifying the relay apparatus 210 having a stronger radio wave reception strength as the handover destination to the communication terminal 300. The identification information of the relay apparatus 210 may be any information which may be able to identify the relay apparatus 210.

The change determination part 222 determines the temporal changes in the radio wave reception strength from the other multiple relay apparatuses 210. The change determination part 222 may identify the relay apparatus 210 having less temporal changes in the radio wave reception strength among the other multiple relay apparatuses 210.

For example, the identification part 215 identifies the relay apparatus 210 having less temporal changes in the radio wave reception strength among multiple relay apparatuses 210 as the handover destination from the relay apparatus 210 of the communication terminal 300. For example, the identification part 215 identifies the relay apparatus 210 having the least temporal changes in the radio wave reception strength as the handover destination. For example, the terminal communication part 214 transmits, to the communication terminal 300, a signal to execute handover to the relay apparatus 210 having less temporal changes in the radio wave reception strength among multiple relay apparatuses 210. For example, the terminal communication part 214 transmits, to the communication terminal 300, a signal to execute handover to the relay apparatus 210 having the least temporal changes in the radio wave reception strength. For example, the identification part 215 identifies the relay apparatus 210 having stronger radio wave reception strength and less temporal changes in the radio wave reception strength as the handover destination from the relay apparatus 210 of the communication terminal 300. For example, the terminal communication part 214 transmits, to the communication terminal 300, a signal to execute handover to the relay apparatus 210 having a stronger radio wave reception strength and smaller temporal changes in the radio wave reception strength.

The fact that the temporal changes in the radio wave reception strength from other relay apparatuses 210 are small means that it is highly likely that the other relay apparatuses 210 have not moved, or if it has moved, the movement speed is a low speed. Therefore, by causing the communication terminal 300 to be handed over to the relay apparatus 210 having less temporal changes in the radio wave reception strength, it is possible to stabilize the communication by the communication terminal 300 after the handover.

The estimation part 224 infers that the relay function has been turned off by monitoring the state of the moving body with the relay apparatus 210 installed therein while the relay function is turned on. The estimation part 224, for example, infers that the relay function has been turned off if the movement speed of the moving body satisfies the predetermined conditions. Moreover, the estimation part 224, for example, infers that the relay function has been turned off if the movement speed of the moving body is slower than a predetermined speed.

For example, if the relay apparatus 210 is installed in the vehicle 200, the estimation part 224 infers that the relay function has been turned off if the driving speed of the vehicle 200 satisfies the predetermined conditions. The estimation part 224, for example, infers that the relay function has been turned off if it monitors the changes in the driving speed of the vehicle 200 and determines that the likelihood that the vehicle 200 is parked is high. The relationship between the changes in the driving speed and whether or not the vehicle 200 has been parked, for example, may be derived by executing machine learning on a large amount of data indicating the changes in the driving speed and whether or not the vehicle 200 has been parked.

Moreover, the estimation part 224 infers that the relay function has been turned off if the driving speed of the vehicle 200 is slower than a predetermined speed. If the driving speed of the vehicle 200 is slower than the predetermined speed, the likelihood that the vehicle 200 is parked and the engine and the power source are turned off is high, thereby making it highly likely that the relay function is turned off.

If the estimation part 224 infers that the relay function has been turned off, the terminal communication part 214 may determine that the predetermined conditions for switching off the relay function have been satisfied. As the estimation part 224 infers that the relay function has been turned off, the terminal communication part 214 may transmit, to the communication terminal 300, which is within the zone of the relay apparatus 210, a signal to execute handover to a handover destination which is identified before it is estimated that the relay function has been turned off.

The base station communication part 212 may be an example of a base station communication means. The terminal communication part 214 may be an example of a terminal communication means. The terminal communication part 214 may be an example of a signal transmission means. The identification part 215 may be an example of an identification means. If the relay apparatus 210 does not include the identification part 215, however, other apparatuses such as the wireless base station 100 include the identification part, and the identification part included in the other apparatus may be an example of an identification means. The relay function management switch 216 may be an example of a relay function management means. The reception strength measurement part 220 may be an example of a reception strength measurement means. The change determination part 222 may be an example of a change determination means. The estimation part 224 may be an example of an estimation means.

Figure 4:
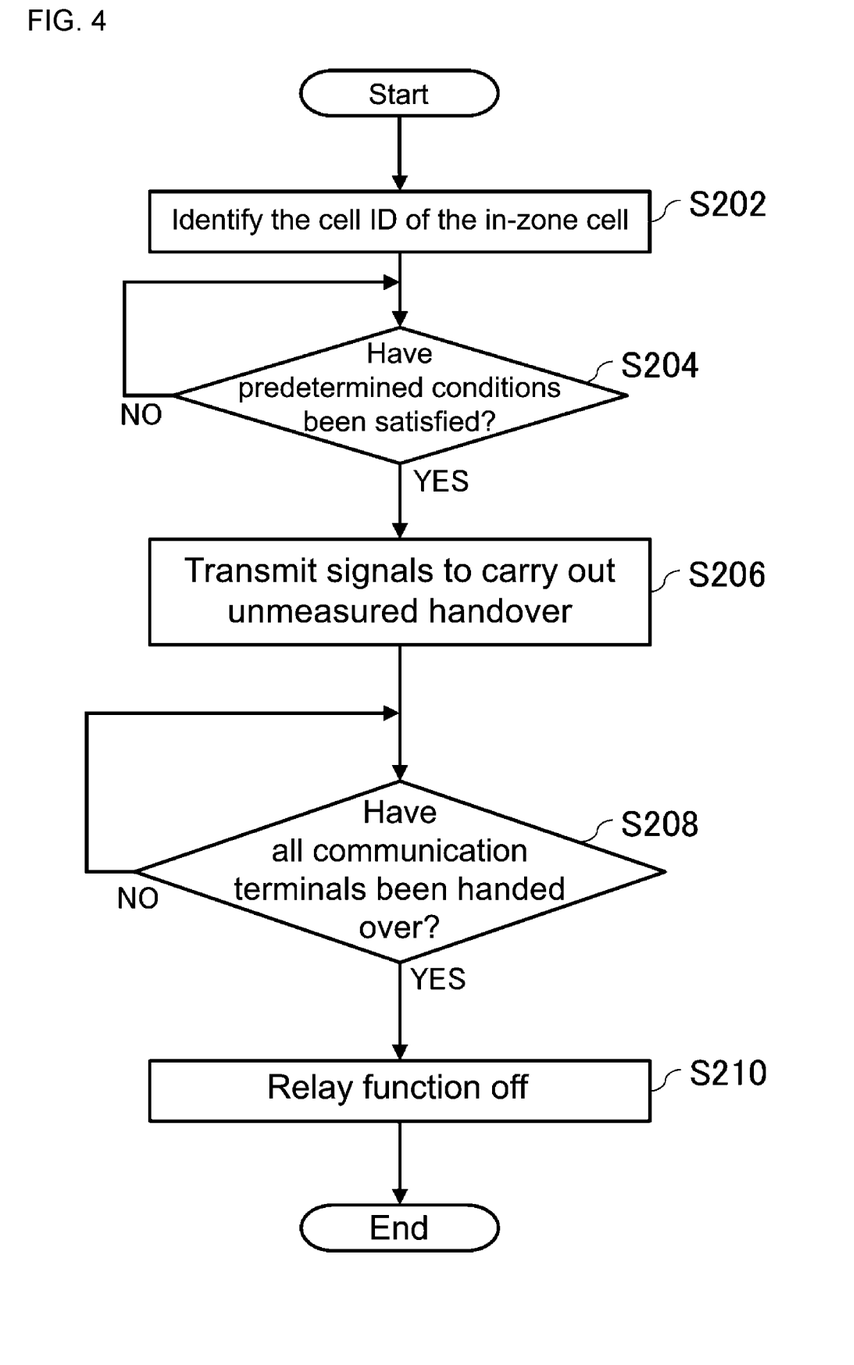
FIG. 4 schematically illustrates an example of the process flow according to the relay apparatus 210 in accordance with one aspect of the present disclosure.

FIG. 4 schematically illustrates one example of the process flow according to the relay apparatus 210. Here, if the predetermined conditions for switching off the relay function have been satisfied, the process flow of switching off the relay function after the communication terminal 300, which is within the zone of the relay apparatus 210, carries out handover is schematically illustrated.

In S202, the identification part 215 identifies the cell ID of the wireless base station 100 in which the relay apparatus 210 is within the zone. The cell ID of the wireless base station 100 in which the relay apparatus 210 is within the zone may be managed by the base station communication part 212, wherein the identification part 215 may acquire the cell ID from the base station communication part 212.

In S204, the terminal communication part 214 determines whether or not the predetermined conditions for switching off the relay function have been satisfied. If it is determined that they are satisfied, the process proceeds to S206. Note that before the predetermined conditions have been satisfied, if the relay apparatus 210 has been within the zone of a wireless base station 100 different from the in-zone wireless base station 100, the process may return to S202. In S206, the terminal communication part 214 transmits, to the communication terminal 300, which is within the zone of the relay apparatus 210, a signal to execute unmeasured handover to the handover destination identified by the cell ID identified in S202.

In S208, all the communication terminals 300 which are within the zone of the relay apparatus 210 are watched and awaited to carry out handover. If all communication terminals 300 carry out handover, the process proceeds to S210. In S210, the relay function management switch 216 turns off the relay function. The process is then finished.

Before the predetermined conditions for switching off the relay function have been satisfied, the terminal communication part 214 may transmit the cell ID (identified in S202) to the communication terminal 300, which is within the zone of the relay apparatus 210. In this case, if the communication terminal 300 does not execute handover depending on the reception of the cell ID, but receives a signal to execute an unmeasured handover to the wireless base station 100 identified by the cell ID from the relay apparatus 210, an unmeasured handover may be executed.

Figure 5:
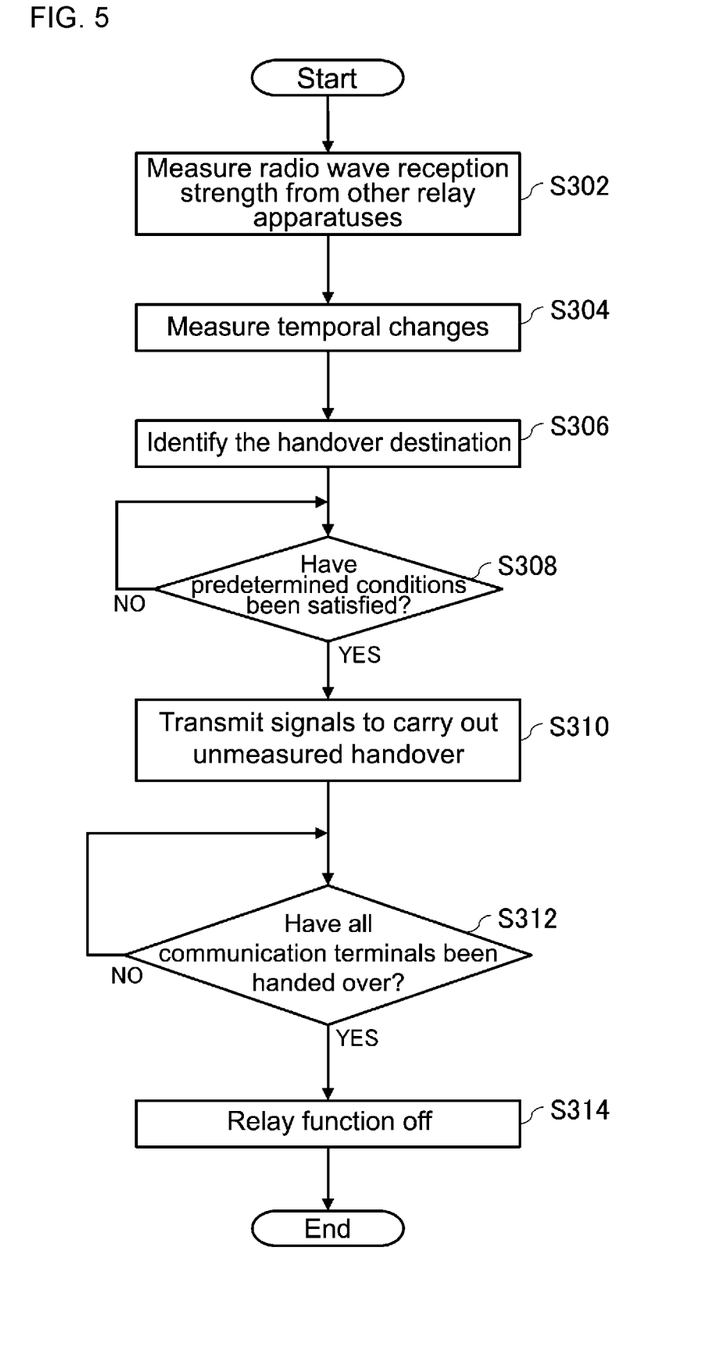
FIG. 5 schematically illustrates an example of the process flow according to the relay apparatus 210 in accordance with one aspect of the present disclosure.

FIG. 5 schematically illustrates another example of the process flow according to the relay apparatus 210. Here, the points different from FIG. 4 will mainly be described.

In S302, the reception strength measuring part 220 measures the radio wave reception strength from other multiple relay apparatuses 210. In S304, the change determination part 222 determines the temporal changes in the radio wave reception strength from the other multiple relay apparatuses 210.

In S306, the identification part 215 identifies the relay apparatus 210 having the least temporal changes in the radio wave reception strength from amongst multiple relay apparatuses 210 having a radio wave reception strength that is stronger than a specific strength as the handover destination from the relay apparatus 210 of the communication terminal 300, which is within the zone of the relay apparatus 210. Note that the identification part 215 may identify a predetermined number of relay apparatuses 210 in the order of stronger radio wave reception strength and identify the relay apparatus 210 having the least temporal changes in the radio wave reception strength among the identified relay apparatuses 210 as the handover destination.

In S308, the terminal communication part 214 determines whether or not the predetermined conditions for switching off the relay function have been satisfied. If it is determined that the conditions are satisfied, the process proceeds to S310. In S310, the terminal communication part 214 transmits, to the communication terminal 300, which is within the zone of the relay apparatus 210, a signal to execute an unmeasured handover to the handover destination identified in S306.

In S312, all communication terminals 300 in the zone of the relay apparatus 210 are watched and awaited to carry out handover. If all communication terminals 300 carry out handover, the process proceeds to S314. In S314, the relay function management switch 216 turns the relay function off. The process is then finished.

Figure 6:
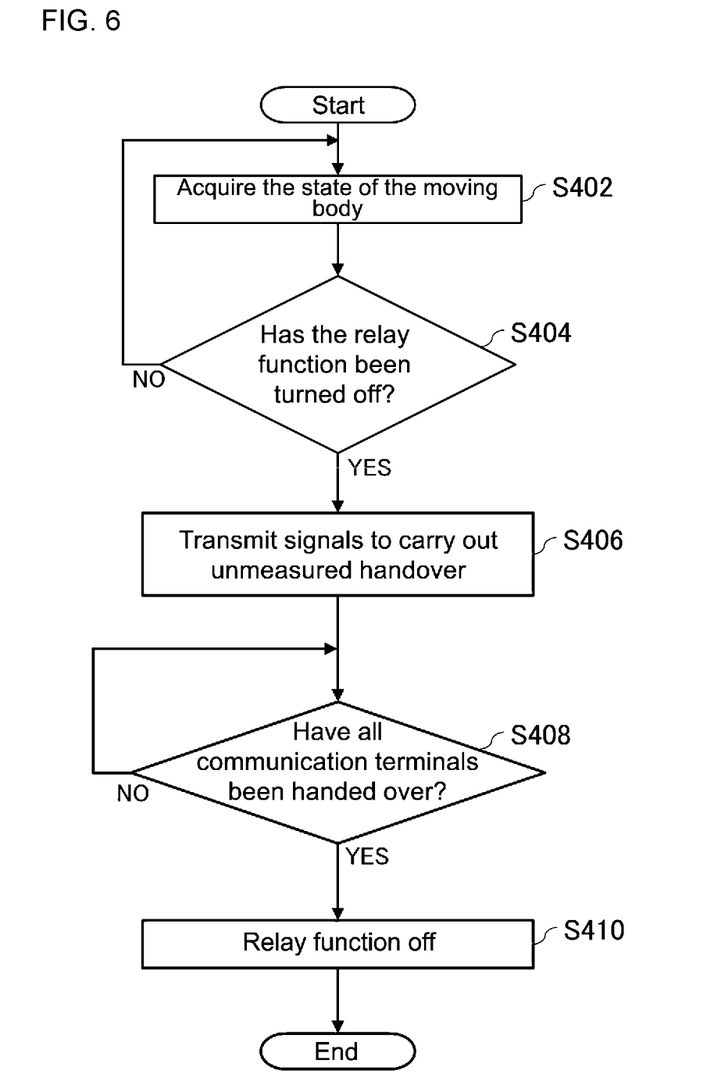
FIG. 6 schematically illustrates an example of the process flow according to the relay apparatus 210 in accordance with one aspect of the present disclosure.

FIG. 6 schematically shows an example of the processing flow by the relay apparatus 210, and a state in which the estimation part 224 monitors the state of the moving body on which the relay apparatus 210 is installed will be described as a start state. In this embodiment, it is assumed that the handover destination from the relay apparatus 210 of the communication terminal 300 in the relay apparatus 210 has already been specified by the identification part 215.

In S402, the estimation part 224 acquires the state of the moving body with the relay apparatus 210 installed therein. In S404, the estimation part 224 estimates whether or not the relay function has been turned off based on the state of the moving body acquired in S402. The estimation part 224, for example, infers that the relay function has been turned off if the movement speed of the moving body satisfies the predetermined conditions. If it is estimated that the relay function has been turned off, the process proceeds to S406; in contrast, if it is not estimated that the relay function has been turned off, the process returns to S402.

In S406, the terminal communication part 214 transmits, to the communication terminal 300 (which is within the zone of the relay apparatus 210), a signal to execute an unmeasured handover to the handover destination identified by the identification part 215. In S408, all communication terminals 300 in the zone of the relay apparatus 210 are watched and awaited to carry out handover. If all communication terminals 300 carry out handover, the process proceeds to S410. In S410, the relay function management switch 216 turns the relay function off. The process is then finished.

Figure 7:
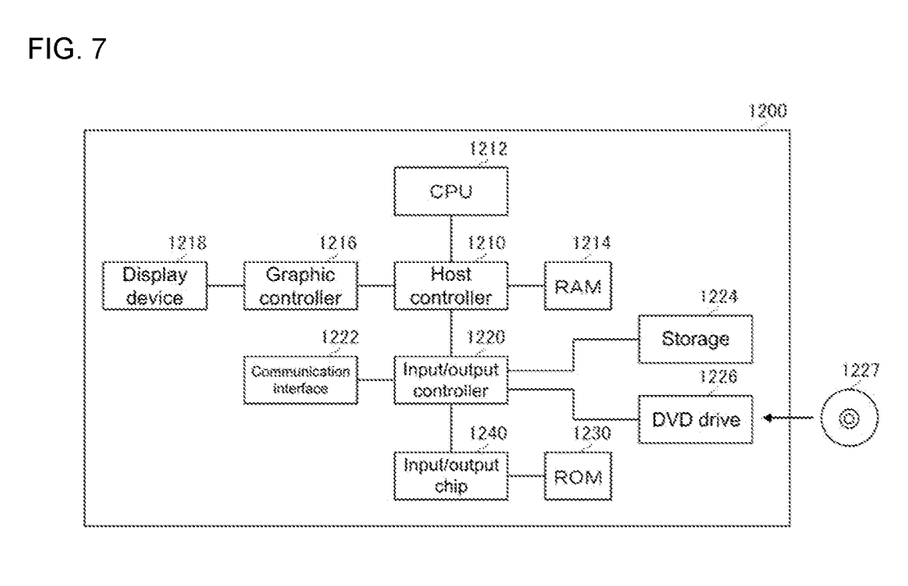
FIG. 7 schematically illustrates an example of a hardware configuration of a computer 1200 functioning as the relay apparatus 210 in accordance with one aspect of the present disclosure.

FIG. 7 schematically illustrates one example of a hardware configuration of a computer 1200 functioning as the relay apparatus 210. A program, or set of instructions, installed in the computer 1200 can allow the computer 1200 to function as one or more "parts" of the apparatus according to the abovementioned embodiment, or allow the computer 1200 to execute an operation associated with the apparatus according to the abovementioned embodiment or the abovementioned one or more "parts," and/or allow the computer 1200 to execute a process according to the abovementioned embodiment or stages of this process. Such a program may be executed by a central processing unit ("CPU") 1212 in order for the computer 1200 to execute the specific operation associated with some or all of blocks of the flowchart and block diagram described in the present specification.

The computer 1200 according to this embodiment includes the CPU 1212, a random access memory ("RAM") 1214, and a graphic controller 1216, which are connected to each other by a host controller 1210. The computer 1200 also includes input/output units such as a communication interface 1222, a storage apparatus 1224, a DVD drive 1226, and IC card drive, wherein these are connected to a host controller 1210 via an input/output controller 1220. The DVD drive 1226 may be a DVD-ROM drive, a DVD-RAM drive, etc. The storage apparatus 1224 may be a hard disk drive, solid state drive, etc. The computer 1200 also includes the input/output unit of a legacy such as a ROM 1230 and a touch panel, with these connected to the input/output controller 1220 via an input/output chip 1240.

The CPU 1212 operates according to the programs stored in the ROM 1230 and the RAM 1214, thereby controlling each part. The graphic controller 1216 acquires image data generated by the CPU 1212 in a frame buffer, etc. provided in the RAM 1214 or in itself, such that the image data is displayed on a display device 1218. The computer 1200 need not include the display device 1218, in which case, the graphic controller 1216 causes the image data to be displayed on an external display device.

The communication interface 1222 communicates with other electronic devices via a wireless communication network. The storage apparatus 1224 stores the program and data used by the CPU 1212 in the computer 1200. The DVD drive 1226 reads the program or data from a DVD-ROM 1227, etc. and provides it to the storage apparatus 1224. The IC card drive reads programs and data from an IC card and/or writes the programs and data in the IC card.

The ROM 1230 stores therein, a boot program, etc. executed by the computer 1200 upon activation and/or a program dependent on the hardware of the computer 1200. The input/output chip 1240 may also connect various input/output units to the input/output controller 220 via a USB port, etc.

The program is provided by a computer readable storage medium such as a DVD-ROM 1227 or an IC card. The program is read from a computer readable storage medium, installed on the storage apparatus 1224, the RAM 1214, or the ROM 1230, which is also an example of a computer readable storage medium, and executed by the CPU 1212. The information processing described in these programs is read by the computer 1200 so as to cause a linkage between the program and the abovementioned various types of hardware resources. The apparatus or method may be configured by implementing an operation or the processing of information in accordance with the use of the computer 1200.

For example, if communication is executed between the computer 1200 and an external device, the CPU 1212 may execute a communication program loaded on the RAM 1214, then instruct the communication interface 1222 on communication processing based on the process described in the communication program. The communication interface 1222 reads transmission data stored in a buffer region provided in a storage medium, such as the RAM 1214, the storage apparatus 1224, the DVD-ROM 1227, or the IC card, under the control of the CPU 1212, transmits the read transmission data to a network, or writes data received from the network in a reception buffer region, etc. provided on the storage medium.

Moreover, the CPU 1212 may allow all or necessary parts of files or databases stored on external storage media such as the storage apparatus 1224, the DVD drive 1226, DVD-ROM 1227, or the IC card, to be read by the RAM 1214, then execute various types of processing on data on the RAM 1214. The CPU 1212 may then write back the processed data to the external recording medium.

Various types of information such as various types of programs, data, tables, and databases may be stored in a recording medium and undergo information processing. The CPU 1212 may execute various types of processing, including various types of operations, information processing, condition determination, conditional branching, unconditional branching, information retrieval/substitution, etc. which are described throughout the present disclosure and specified by the program instruction sequence, on data read from the RAM 1214, then write back the results to the RAM 1214. Moreover, the CPU 1212 may retrieve information in a file, database, etc. in the recording medium. For example, if multiple entries, each having the attribute value of the first attribute associated with the attribute value of the second attribute, are stored in the storage medium, the CPU 1212 may retrieve an entry matching the conditions under which the attribute value of the first attribute is specified among the multiple entries, then read the attribute value of the second attribute stored in the entry, thereby acquiring the attribute value of the second attribute associated with the first attribute satisfying predetermined conditions.

The programs or software modules described above may be stored on the computer 1200 or in a computer readable storage medium in the vicinity of the computer 1200. Moreover, a recording medium such as a hard disk or RAM provided in a server system, which is connected to a dedicated communication network or the Internet, can be used as a computer readable storage medium, thereby providing the program to the computer 1200 via a network.

The blocks in the flowcharts and block diagrams in the abovementioned embodiment may represent "parts" of the apparatus having the stage of the process for executing an operation or the role of executing the operation. The specific stages and "parts" may be implemented by a programmable circuit (which is supplied along with computer readable instructions stored on a dedicated circuit and a computer readable storage medium) and/or a processor, which is supplied along with the computer readable instructions stored on the computer readable storage medium. The dedicated circuit may include digital and/or analog hardware circuits and may also include integrated circuits (ICs) and/or discrete circuits. The programmable circuit may include, for example, reconfigurable hardware circuits including a logical product, logical sum, exclusive logical sum, negative logical product, negative logical sum, other logical operations, flip-flops, registers, and memory elements such as a field programmable gate array ("FPGA") and a programmable logic array ("PLA").

The computer readable storage medium may include any tangible device capable of storing instructions executed by an appropriate device, so that the computer readable storage medium having the instructions stored therein includes products including instructions which may be executed in order to create a means for executing the operations specified in the flowchart or block diagram. Exemplary computer readable storage media may include electronic storage media, magnetic storage media, optical storage media, electromagnetic storage media, semiconductor storage media, etc. More specific examples of computer readable storage media include floppy (registered trademark) disks, diskettes, hard disks, random access memories (RAMs), read-only memories (ROM), erasable programmable read-only memories ("EPROMs" or flash memories), electrical erasable programmable read-only memories ("EEPROMs"), static random access memories ("SRAMs"), compact disk read-only memories ("CD-ROMs"), digital versatile disks ("DVDs"), Blue-Ray (registered trademark) disks, memory sticks, integrated circuit cards, etc.

The computer readable instructions may include either a source code or object code described in any combination of one or more programming languages which include assembler instructions, instruction set architecture (ISA) instructions, machine instructions, machine dependent instructions, microcode, firmware instructions, status setting data, or object oriented programming languages, such as Smalltalk, JAVA (registered trademark), or C++, and conventional procedural programming languages, such as "C" programming language or similar programming language.

In order for processors or programmable circuits of general purpose computers, special purpose computers, or other programmable data processing apparatuses, to execute computer readable instructions to create a means for executing operations specified in flowcharts or block diagrams, the computer readable instructions may be provided locally or via a local area network ("LAN"), and a wide area network ("WAN") such as the Internet, to processors or programmable circuits of general purpose computers, special purpose computers, or other programmable data processing apparatuses. Exemplary processors include computer processors, processing units, microprocessors, digital signal processors, controllers, microcontrollers, etc.

Although the present disclosure has been described with reference to the embodiments, the technical scope of the present disclosure is not limited to the scope described in the abovementioned embodiments. It will be apparent to those skilled in the art that various modifications or improvements can be made to the presented embodiments. It is apparent from the description of the claims that such modified or improved embodiments may also be included.

Note that the execution order of each process of operations, procedures, steps, stages, etc. in the apparatuses, systems, programs, and methods indicated in the Claims, Specification, and drawings is not particularly explicitly stated by "prior to," "in advance," etc.; moreover, unless the output of the previous processing is used in the following process, it may be achieved in any order. Although the operation flows in the Claims, Specification, and drawings are described using "first," "next," etc. for convenience, this does not require that the operation flows be carried out in this order.

What is claimed is:

1. A relay apparatus installed in a moving body for relay communication between a wireless base station and a communication terminal, the relay apparatus comprising:
    a relay function management switch for switching from on to off a relay function for relaying communications between the wireless base station and the communication terminal based on satisfaction of a predetermined condition;
    a signal transmitter for transmitting, to the communication terminal establishing a wireless communication connection with the relay apparatus, a signal to execute handover to a handover destination if the predetermined condition has been satisfied, wherein the handover destination is identified prior to the predetermined condition being satisfied and wherein the signal transmitter transmits a radio resource control ("RRC") connection reconfiguration including a specification of the handover destination; and
    an estimation part for inferring that the relay function has been turned off by monitoring a state of the moving body while the relay function is turned on;
    wherein, if the predetermined condition has been satisfied, the signal transmitter transmits, to the communication terminal, the signal to execute handover to the handover destination, wherein the communication terminal executes handover to the handover destination without making a measurement report on a received radio wave;
    wherein the signal transmitter transmits, to the communication terminal, the signal to execute handover with the wireless base station with which the relay apparatus establishes a wireless communication connection serving as the handover destination; and
    wherein the signal transmitter transmits the signal to execute handover to the handover destination to the communication terminal, as the estimation part infers that the relay function has been turned off.

2. The relay apparatus according to claim 1, further comprising:
    a reception strength measurement part for measuring a radio wave reception strength from a plurality of movable relay apparatuses different from the relay apparatus; and
    wherein the signal transmitter transmits, to the communication terminal, the signal to execute handover with the relay apparatus, having a stronger radio wave reception strength among the plurality of movable relay apparatuses, serving as the handover destination.

3. The relay apparatus according to claim 2 further comprising:
    a change determination part for determining a temporal change in the radio wave reception strength from the plurality of movable relay apparatuses different from the relay apparatus; and
    wherein the signal transmitter transmits, to the communication terminal, the signal to execute handover with the relay apparatus, having a stronger radio wave reception strength and a smaller temporal change among the plurality of movable relay apparatuses, serving as the handover destination.

4. The relay apparatus according to claim 1 further comprising:
    a change determination part for determining a temporal change in a radio wave reception strength from a plurality of movable relay apparatuses different from the relay apparatus; and wherein the signal transmitter transmits, to the communication terminal, the signal to execute handover with the relay apparatus, having a smaller temporal change among the plurality of movable relay apparatuses, serving as the handover destination.

5. The relay apparatus according to claim 1 wherein the estimation part infers that the relay function has been turned off if a movement speed of the moving body satisfies the predetermined condition.

6. The relay apparatus according to claim 5 wherein the estimation part infers that the relay function has been turned off if the movement speed of the moving body is slower than a predetermined speed.

7. The relay apparatus according to claim 1 wherein the estimation part infers that the relay function has been turned off upon detecting a power source off operation of the moving body.

8. The relay apparatus according to claim 1 wherein:
the moving body is a vehicle, and
wherein the estimation part infers that the relay function has been turned off upon detecting an ignition off operation of the vehicle.

9. A non-transitory machine-readable storage medium comprising instructions, which when implemented by one or more machines, causes the one or more machines to perform operations comprising:
switching with a relay function management switch from on to off a relay function for relaying communications between a wireless base station and a communication terminal based on a satisfaction of a predetermined condition; and
transmitting with a signal transmitter, to the communication terminal establishing a wireless communication connection with a relay apparatus, wherein the relay apparatus is installed in a moving body, a signal to execute handover to a handover destination if the predetermined condition has been satisfied, wherein the handover destination is identified prior to the predetermined condition being satisfied
transmitting with the signal transmitter if the predetermined condition has been satisfied, to the communication terminal, the signal to execute handover to the handover destination, wherein the communication terminal executes handover to the handover destination without making a measurement report on a received radio wave;
transmitting with the signal transmitter a radio resource control ("RRC") connection reconfiguration including a specification of the handover destination;
transmitting with the signal transmitter, to the communication terminal, the signal to execute handover with the wireless base station with which the relay apparatus establishes a wireless communication connection serving as the handover destination;
inferring that the relay function has been turned off by monitoring a state of the moving body while the relay function is turned on with an estimation part; and
transmitting with the signal transmitter the signal to execute handover to the handover destination to the communication terminal as the estimation part infers that the relay function has been turned off.

10. The non-transitory machine-readable storage medium comprising instructions according to claim 9, further comprising:
measuring a radio wave reception strength from a plurality of movable relay apparatuses different from the relay apparatus with a reception strength measurement part; and
wherein the signal transmitter transmits, to the communication terminal, the signal to execute handover with the relay apparatus, having a stronger radio wave reception strength among the plurality of movable relay apparatuses, serving as the handover destination.

11. The non-transitory machine-readable storage medium comprising instructions according to claim 10 further comprising:
determining a temporal change in the radio wave reception strength from the plurality of movable relay apparatuses different from the relay apparatus with a change determination part; and
wherein the signal transmitter transmits, to the communication terminal, the signal to execute handover with the relay apparatus, having a stronger radio wave reception strength and a smaller temporal change among the plurality of movable relay apparatuses, serving as the handover destination.

* * * * *